United States Patent
Pomernacki et al.

[15] 3,661,313
[45] May 9, 1972

[54] POWER DEVICE HAVING IMPROVED FEED MECHANISM

[72] Inventors: Henry Pomernacki, Northbrook; Oliver E. Saari, Niles, both of Ill.

[73] Assignee: Illinois Tool Works Inc., Chicago, Ill.

[22] Filed: July 22, 1970

[21] Appl. No.: 57,211

[52] U.S. Cl. .............................................. 227/136, 227/96
[51] Int. Cl. ...................................................... B25c 1/04
[58] Field of Search ....................................... 227/95, 96, 136

[56] References Cited
UNITED STATES PATENTS

| | | | |
|---|---|---|---|
| 3,099,837 | 8/1963 | Heilman, Jr. | 227/136 |
| 2,928,094 | 3/1960 | Crooks et al. | 227/136 X |
| 3,353,737 | 11/1967 | Howard et al. | 227/136 |
| 3,563,438 | 2/1971 | Doyle | 227/136 X |

*Primary Examiner*—Granville Y. Custer, Jr.
*Attorney*—Robert W. Beart, Michael Kovac and Jack R. Halvorsen

[57] ABSTRACT

A power device having an improved feed mechanism for advancing collated strips of fasteners in sequential fashion to a power actuated driving mechanism.

6 Claims, 14 Drawing Figures

POWER DEVICE HAVING IMPROVED FEED MECHANISM

BACKGROUND OF THE INVENTION

Feed mechanisms used for moving collated strips of fasteners to a power driving device which have been heretofore used, have generally incorporated either positive drive mechanisms that are powered by suitable means such as sprocket wheels to position a fastener at a predetermined point for driving or alternatively, have employed a spring means and a pusher rod acting on the far extremity of the collated strip remote from the driving means to position the foremost fastener against a stop or other suitable means for locating individual fasteners relative to the driving means. Each of these devices has had its own inherent problems relative to jamming or insufficient power to actuate the strip. Still other devices have utilized gravity feed or vibratory feed to move individual fasteners along a pair of rails which supported the fasteners by their head or other suitable flange means. This form of means had the inherent difficulties of supply of fasteners at a predetermined location at a predetermined time.

SUMMARY

The present invention relates to a power tool having a feed mechanism for advancing a collated strip of fasteners in sequential fashion with the strip being in the form of individual carrying members which support the fastener at its head and at its tip and with the upper or end portion of the individual supporting means being joined to the next adjacent supporting means. The feed means contemplated by this invention include a pair of rails supporting the collated strip, oscillating finger means for advancing the strip a predetermined distance, power means for actuating the finger means, movable first stop means for interrupting movement of said strip along said track, and second movable stop means for controlling actuation of the advancing means said predetermined distance.

The actual powered driving mechanism is utilizable as the movable first stop means so that when the powered driving means is in its extended position, the collated strip is prevented from advancing along the track. The second movable stop means is actuated by the same power operating source which actuates the powered driving means so that the advancing means is prevented from moving the strip until such time as the powered driving means is actually placed in operation at which time the second movable stop means permits advancement of the strip against the powered driving means as it is being retracted to its cocked or operable position. When the driven power means is removed from the path of the track, a supporting member for an individual fastener in the collated strip is moved to the predetermined position for acceptance of the blow by the driven power means.

DESCRIPTION OF THE PREFERRED EMBODIMENT

Referring now to the drawings wherein similar parts are designated by similar numerals, the invention contemplates a new and improved portable power tool with a cylinder body forming a power unit including a reservoir in which a compressible fluid is maintained under pressure. An accumulator piston and a drive piston positioned in said cylinder are simultaneously movable to retracted or cocked positions by the introduction of a non-compressible power fluid into the cylinder in which the pistons are reciprocably movable with the power fluid acting on exposed areas of the drive piston to move it with the accumulator piston until the drive piston reaches its fully cocked position whereupon further movement of the accumulator piston exposes additional areas of the drive piston to pressure of the power fluid. At this point the compressible fluid acting through the accumulator piston upon the power fluid in the cylinder imparts drive movement to the drive piston. The device is fully operable only when it is properly positioned with respect to a workpiece or structure. The tool has means for deactuating a pump used to supply the non-compressible power fluid, before the drive piston reaches its fully cocked position, if the power device is not so properly positioned. The drive piston and the body cylinder include cooperable means for slowing or braking the movement of the drive piston as it approaches its fully extended position to minimize shocks to the body particularly when the power of the drive piston is not utilized for driving an object, such as a fastener, but rather is actuated in free flight. An automatic recycling feed means is provided which is sequentially operated during each operation of the power device. The feed means generally acts upon a collated strip of devices which are to be sequentially acted upon by the power device. Further, there is provided a cut-off mechanism for eliminating portions of the collating means used for holding the devices to be acted upon by the tool.

Thus, the device generally includes the power device 20 having a combined mechanical-electrical control means 22, a feed means 24, and a cut-off mechanism 26.

POWER SOURCE

The power device 20 includes a stepped body portion 30 having a central pass-through bore 32 of a predetermined diameter. The bore 32 is provided with a plurality of counterbores 34, 36, 38, 40 and 42 which are each progressively larger diameters for ease in assembly of various items coaxially within the bore. Counterbore 34 accepts a metallic sleeve bearing 44 while counterbores 36 and 38 accept bearings 46 and 48 respectively with a sealing member 50 being sandwiched between the two bearings and restrained thereby against axial movement. Radially offset in body 30 from the central bore 32 is an axially extending fluid passageway 60 communicating with the lower extremity of counterbore 40, as viewed in FIGS. 2 and 3, and having a pair of lateral ports 62 and 64, for purposes best set forth hereinafter.

A cylinder 70 provided at one end with an external threaded portion 72 is threaded into counterbore 42 with its mating threads 52. The cylinder 70, adjacent said one end, has an annular recess adapted to accept an O-ring sealing member 74 for sealing engagement with an unthreaded portion of the side wall of counterbore 42. The cylinder 70 has a bore 76 including a taper 78 at its lower extremity, adjacent said one end, and an enlarged cavity at its opposite or upper extremity forming a chamber 80. The upper end of the chamber 80 is threadedly apertured to accept a mating threaded cap 82 and further includes a recess 84 for acceptance of an O-ring seal 86 which is compressibly captured between the flange of cap 82 and the end wall portion of chamber 80. The cap 82 is centrally apertured and provided with a cylindrical extension 88 which is tubular in form and extends into the chamber 80 for a substantial portion of the axial extent of chamber 80. A valve means 90 is positioned within the bore of the cap 82 and communicates with chamber 80 for purposes best set forth hereinafter.

Positioned within the bore 32 is the power drive piston 100 which includes a preferably cylindrical central portion 102 and enlarged upper end portion 104, cylindrical in form and connected to the central portion 102 by an upwardly and outwardly tapering portion 106. At the opposite end of central portion 102, the drive piston is provided with a groove 108 forming a shoulder 110 which faces towards the enlarged end portion. The balance of the lower end of the drive piston 100, in the illustrated embodiment, is a generally reduced cylindrical portion or hammer 112 smaller in diameter than the bore 32 and preferably hardened to serve as the hammer or power impacting portion of the drive piston. The bearing members 44, 46, and 48 are so dimensioned relative to the central portion 102 of the drive piston 100 as to laterally support the device during its axial movement within the bore 32 and into retracted position within cylinder 76. The seal 50 provides a sliding seal which prevents egress of fluids around piston 100 between bore 32 and cylinder 76.

The upper end surface of the enlarged end portion 104 of piston 100 is recessed to form an open end chamber 114 having a bottom wall 115 and side walls 116 which are frustoconical in configuration and have their widest diameter at the free or open end of the chamber.

Positioned within the cylinder bore 76 is a free floating accumulator piston 120 having annular recesses intermediate its extremities to accept the seal 122 and lateral circumferentially disposed bearing means 124 and 126. The seal 122 is preferably a lip seal for sliding engagement with the bore 76 and may be manufactured or urethane. Due to the physical properties of urethane the lip seal 122 is reinforced by a buna-n O-ring 128 to provide additional stability to the lip seal 122. Stability of the accumulator piston 120 within cylinder 76 is enhanced by the bearings 124-126 which preferably are of the self-lubricating variety. They may be fabricated from a lubricious plastic material such as those commonly sold under the tradenames of "nylon" or "Teflon." A cylindrical projection 130 extends from the lower end of the accumulator piston 120 and is so dimensioned as to be accepted within the frustoconical wall configuration 116 of the open end chamber 114 located in the enlarged head or end portion 104 of the drive piston 100. The juncture between the extension 130 and the side wall 116 intermediate the axial extremities of wall 116 forms an effective seal and yet permits axial separation between the members under specific conditions which will be set forth hereinafter.

Figures 5, 6, 10, 14:
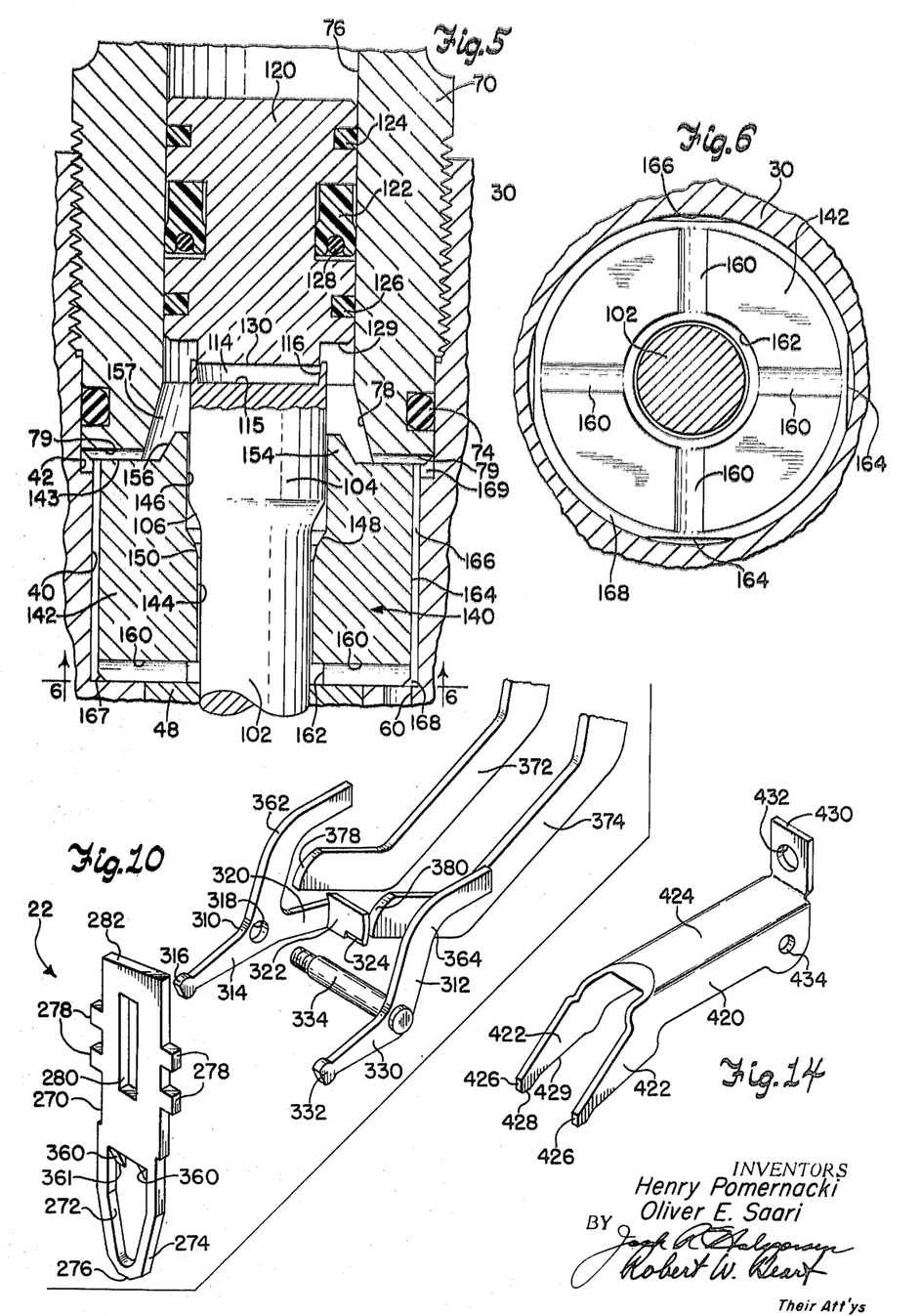
FIG. 5 is an enlarged partial section of the accumulator piston, the upper end of the power drive piston, and the brake of the device shown in FIGS. 2–4.
FIG. 6 is a partial bottom end view in section taken along line 6—6 of FIG. 5.
FIG. 10 is an expanded perspective view of the elements of the control and cut-off mechanism.
FIG. 14 is a perspective of the feeder finger means.

Located complimentarily within counterbore 40 and surrounding the drive piston 100 is a brake mechanism 140 which includes a body 142 having a central throughbore 144 with a complimentary shape slightly larger by a few thousandths of an inch than the central portion 102 of piston 100, this difference in size being overaccentuated in the drawing for clarity of illustration. An enlarged counterbore 146 is joined in the bore 144 by two frustoconical wall portions 148 and 150 each having a different included angle, portion 148 having an angle of approximately 30° measured relative to the axis of bore 144, while piston 150 has an angle of approximately 15° measured relative to the axis of bore 144. The counterbore 146 is extended axially beyond the one extremity of body 142 by means of the flange 154 which has an outer frustoconical wall 156, having an included angle slightly greater than taper 78 to provide an upwardly opening throat 157, as viewed in FIG. 5, between the facing surfaces of the two members. The opposite extremity of body 142 as best seen in FIG. 6, is provided with a plurality of grooves 160 which extend radially from an annular counterbore 162 forming a recess around the drive piston central portion 102 when positioned within bore 144. The side wall of the body 142 is provided with a plurality of flats 164 which each form a recess 166 extending axially between the brake body 142 and the counterbore 40 of main body portion 30. The end of the side wall adjacent grooves 160 is chamfered as at 167 to form an annular chamber 168 between the brake 140 and the bottom wall of the counterbore 40, while at the same time, providing communication between the axial chambers 166 formed by the flats 164 and the grooves 160. The axial extent of brake body 142 is slightly greater than the axial extent of counterbore 40, whereby the body 142 extends into counterbore 42 forming an annular cavity 169. The lower extremity of cylinder 70 when screwed in tightly bears against the upper wall 143 of brake body 142. Cylinder 70 further is provided at its free end with a plurality of grooves 79 which are generally radially extending and communicate with cavity 169. Thus, free access is provided for fluids introduced through bore 60 to the chamber 168 for passage either through grooves 160 and counterbore 162 thence upwardly between piston 100 and bore 144, into contact with the undersurface of portion 106 or, from chamber 168 through axial recess 166 into chamber 169 and thence through grooves 79 and throat 157 into contact with the exposed undersurface area 129 of accumulator piston 120, as will be further discussed hereinafter.

Intermediate the extremities of the body 30, a pair of oppositely disposed slots 170 communicate between the exterior and the bore 32. In the preferred embodiment, the body 30 has an enlarged upper section and a reduced lower portion and the slots 170 are generally positioned at the juncture between these two sections. Positioned within slots 170 are a pair of fingers 172 each being rotated at one end on a pin 174 mounted in the enlarged upper section. Each finger 172 has an abrupt shoulder 176 at its opposite extremity. Adjacent to shoulder 176 is a sliding or cam surface 178 adapted to ride on the central portion 102 of the piston 100 and with the abrupt shoulder 176 adapted to cooperate with the shoulder 110 of the drive piston 100. A leaf spring 180 is fastened by a rivet or screw 182 at one end and at its opposite or free end 184 bears against each of the fingers 172 to serve as a biasing means to urge the fingers 172 into engagement with the piston and its associated shoulder 110. The fingers 172 effectively control the upper limit of travel of the piston 100 while permitting free movement of the piston to an extended or lower portion, as viewed in the drawings. It will be apparent that other means such as spring loaded balls or plungers that can be hydraulically or spring actuated will operate effectively as a stop means.

At the free end of the body 30 adjacent bore 32, there is provided a nose piece 190, having a tapered lower portion 192 adapted to permit entry of the tool into confined spaces. The upper portion of nose piece 190 is defined by a pair of flanges 194 which are apertured for acceptance of a pair of bolts 196 for fastening of the nose piece in embracing relation to the body 30. The interior of the nose piece is further defined by a fore and aft passageway having a pair of opposed vertical side walls 198 and lower inwardly tapering portions 200 which meet in a radiused section 202 on the vertical axis of the nose piece. At the upper end of the passageway defined by walls 198 a track means is positioned and defined by oppositely extending grooves 204, while centrally of the nosepiece 190 there is located a vertical bore 210 which traverses the fore and aft passageway. This particular nose piece was designed to accept a collated strip 216 of fasteners 217 shown in phantom in which the collating means 216 includes individual plastic elements or holders having laterally extending head means adapted to ride in track 204 and a body portion adapted to position a fastener 217 held by the collating means in coaxial position with the drive piston within the bore 210. The bore 210 has a dimension sufficiently large to accept the hammer portion 112 of the drive piston 100 plus the material thickness of the collating means.

In the operation of this power source several physical relationships must be kept in mind. The area of the face or surface 115 of the piston head, defined by the frustoconical wall 116, is greater than the cross-sectional area of the drive piston 100 at the seal 50 so that when the side wall 116 seals between the projection 130 on the accumulator piston and the drive piston head, any fluid pressure which is exerted on the drive piston tends to move the piston head toward the accumulator piston and hold it in tight engagement therewith. Accordingly, fluid pressure introduced through port 62 into the bore 60 of the body and thence through the chamber 168, grooves 160 and bore 144, when the accumulator piston and the drive piston are in the position illustrated in FIGS. 2, 3, 5 and 9, will tend to force the drive piston head into engagement with the accumulator piston 120 and tend to move the drive piston 100 upwardly as seen in these figures.

Figure 3:
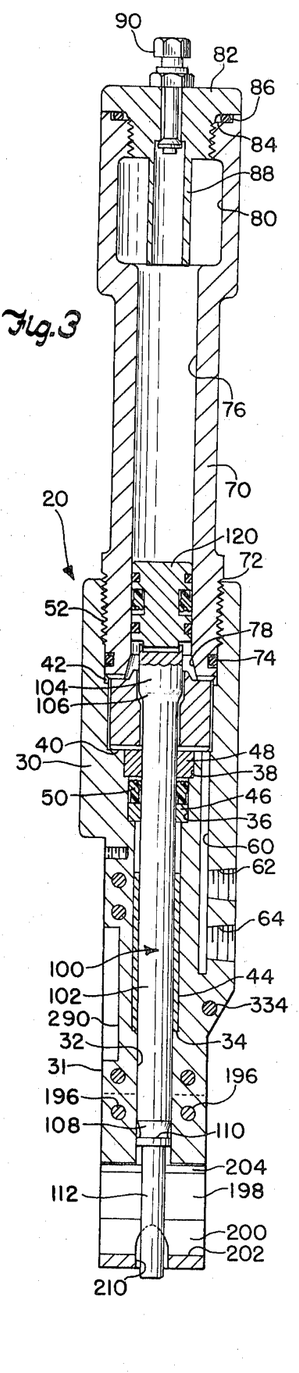
FIG. 3 is a side elevation in partial section of the power unit used by the invention with the power drive piston in extended position.

Compressed gas is introduced into the power accumulator or compressed gas chamber 80 through valve 90. It will be apparent that when the chamber 80 is charged with a gas under pressure, the accumulator piston 100 will be forced downwardly, as seen in FIG. 3, to tend to hold the drive piston in the position illustrated in FIG. 3, and with the projection 130 moved into sealing relationship with the frustoconical side wall 116. The compressed gas charge that is introduced through valve 90 normally has a pressure of approximately 2,000 p.s.i. A suitable gas for use in a device of this type is nitrogen, although other forms of non-explosive, compressible gases can be used with equal facility.

Figure 4:
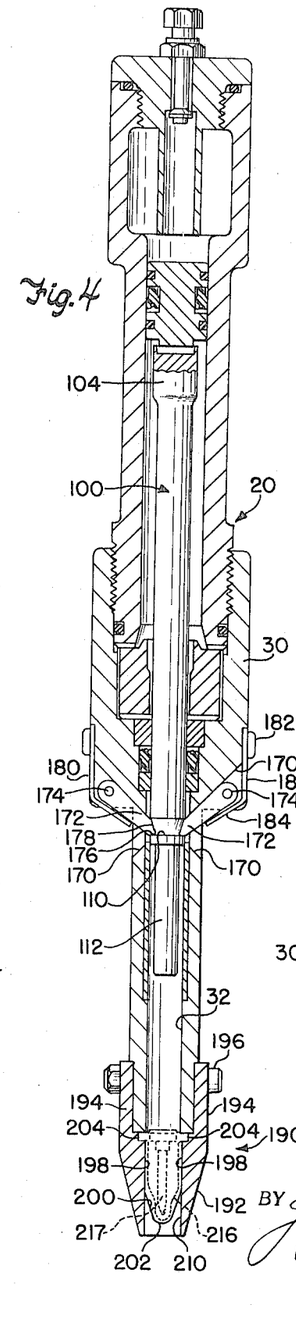
FIG. 4 is a front elevation in partial section of the power unit shown in FIG. 3 with the power drive piston in retracted position.

To cause the operation of the power source to perform some work, such as the driving of a nail, a non-compressible fluid is introduced from a reservoir by a pump, neither of which are shown, but which are well known in the art, through the port 62 into the bore 60 and thence through the various passageways into the clearance between bore 144 in the central body portion 102 of the drive piston 100, into engagement with the undersurface 106 of the head 104 of the drive piston. As the power fluid is pumped into the main bore, it causes the accumulator piston 120 and the drive piston 100 to be moved upwardly as seen in FIG. 3. The drive piston is caused to move upwardly with the accumulator piston since, as was explained above, the area of the surface 115, as well as the area of the tapered portion 106 of head 104 is greater than the cross-sectional area of the piston 100 at the seal 50 so that the fluid pressure acting on the drive piston tends to force the drive piston toward the accumulator piston. Continued introduction of the power fluid to the bore forces the accumulator piston 120 and the drive piston 100 to move upwardly toward the fully retracted positions thereof illustrated in FIG. 4 against the force exerted by the compressed gas in the power accumulator or chamber 80. The drive piston and the accumulator move upwardly until the fingers 172 bring their associated shoulders 176 into engagement with the shoulder 110 on the drive piston 100. At this time, the drive piston is in its fully retracted or cocked position. The accumulator piston, however, is free to continue such movement as the pumping of the power fluid continues. Such separation, as seen in FIG. 4, separates the seal between the projection 130 and the side walls 116. Once this seal is broken, the pressure of the power fluid is now exerted across the whole cross-sectional area of the face 115 of the drive piston head 104 and as a result, the drive piston is now moved forcibly and with great velocity downwardly due to the force exerted by the compressed gas of the power fluid in the main bore of the cylinder 76. Since the power fluid is non-compressible, it serves as a linkage or transfer means for the force being exerted by the compressed gas through the power fluid against the head 104 of the drive piston 100. The accumulator moves behind and follows the drive piston but since it extends across the full cross-sectional area of the bore of the cylinder, it moves at a slower speed than the drive piston. Such rapid movement of the drive piston, of course, drives the nail or other fastener into the workpiece or structure.

The frustoconical portion 106 at the undersurface of head 104, is disposed at an angle of approximately 30° to the vertical axis of the piston 110. This frustoconical shape of the head 104, causes the head to tend to trap power fluid in the reduced annular shape of bore 146 and thence against the double frustoconical counterbore 148–150. Additionally, as the head progresses down the cylinder 76, the power fluid tends to be forced outwardly through the throat 157 and the associated passageways communicating therewith. As a result, the entrapment of the power fluid between frustoconical face 106 and the reduced bore 146 and its associated counterbores 148–150, slows down the drive piston as it approaches the end of its power stroke and cushions the shock of the engagement between the head 104 and the brake 140. The accumulator piston 120 is now spaced from the drive piston head due to the presence of the additional power fluid which has been pumped into the cylinder 76. The pump, of course, may continue to pump during the working or driving stroke of the drive piston, but the movement of the drive piston is primarily due to the force exerted by the compressed gas in the chamber 80 which is transmitted through the accumulator piston to the power fluid, acting as a linkage, against the surface 115.

The power fluid in front of the accumulator piston is now forced by the pressure of the compressed gas in the chamber 80 and the cylinder 76, to move backwardly through the various passages into the bore 60 and out the port 62 into the reservoir, not shown. As a result, the accumulator piston moves downwardly until its extension 130 once again engages the wall 116 of the drive piston head and again provides a seal between the head 104 and the accumulator piston 120. The power source is then again in condition for another cycle of operation.

It will now be apparent that the power source illustrated and described performs work due to the expansion of the compressed gas in the power accumulator or gas chamber 80 and cylinder 76. The pressure of the gas introduced into the gas chamber 80 may be initially of a relatively large value, say 2,000 per square inch, and with the further compression of the gas in the chamber 80, due to the movement of the accumulator piston 120 in the cylinder 76 by the non-compressible power fluid, causes it to attain a pressure of a still higher value, say 4,000 pounds per square inch, while the power fluid will reach 6,000 p.s.i. at the time of separation between the power piston and the accumulator piston. Thus, the energy stored in the compressed gas is employed to drive the piston, using the power fluid as a linkage between the accumulator piston and the drive piston, and thus perform such functions as the driving of a fastener into a workpiece. Normally, the volume of the drive piston in its axial movement of approximately 4 inches is equal to the volume of the accumulator piston in its movement of 1 to 1½ inches during the power stroke. The power fluid is virtually non-compressible and has approximately the same displacement. It should be noted that the extension 88 of the cap 82 serves as a safety device to prevent movement of the accumulator piston 120 out of the cylinder bore 76 into the power accumulator or gas chamber 80. Thus, the piston 120 is maintained in its oriented position within the cylinder 76, as well as preventing over-compression of the gas within the chamber 80 by providing a stop to the axial movement of the piston 120 after separation from piston 100 when it contacts the lower extremity of the tube 88.

It has been found occasionally that the seal 122 under the pressures developed, permits passage of the power fluid into cylinder 76 and comingles it with the compressed gas. Due to the heat generated in the compression of the gas, the power fluid is atomized and can produce an undesirable condition.

Figure 7:
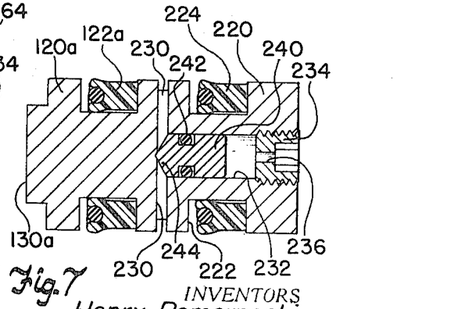
FIG. 7 is a side elevational view of a second embodiment of the accumulator piston.

To this end, a second embodiment of the accumulator piston is shown in FIG. 7, wherein similar parts are designated by similar numerals with the addition of the suffix a. This embodiment includes virtually a one piece double piston, including portion 120a having a single seal 122a, and the forward projection 130a adapted to seal with the cavity in the end of head 104 in the same fashion as the first embodiment. This embodiment includes an extension 220 provided with a circumferential cavity 222 for acceptance of a second seal 224. At the juncture between extension 220 and the basic portion 120a, there is provided a plurality of transverse passageways 230 which communicate between the periphery of the piston and a central bore 232 which opens through the opposite end of extension 220. The open end of bore 232 is closed by a threaded plug 234 having a central pass-through bore 236 providing limited ingress and egress to the bore 232. Positioned within bore 232 is a free floating piston 240 having an annular groove adapted to accept an O-ring seal 242. The free end 244 of piston 240 is conically shaped and adapted to intersect and close the passageways 230 communicating with the periphery of the embodiment. In the operation of this device in the environment previously described, it will be appreciated that the compressed gases from chamber 80 will pass through the bore 236 and act upon the end of the piston 240 to maintain it in the seated position shown in FIG. 7. In the event that the power fluid should by-pass seal 122a, it will seek the passageway 230 and act against the relatively small diameter piston 240 to move the piston to the right, as viewed in FIG. 7, against the compressed gas and to form a reservoir within the bore 232. The relative cross-sectional areas of piston 240 and seal 224, are such that the piston will be acted upon more readily by the power fluid than the seal and thus the power fluid will be prevented from passing into the cylinder 76 and chamber 80 to comingle and atomize with the compressed gas.

Figure 1:
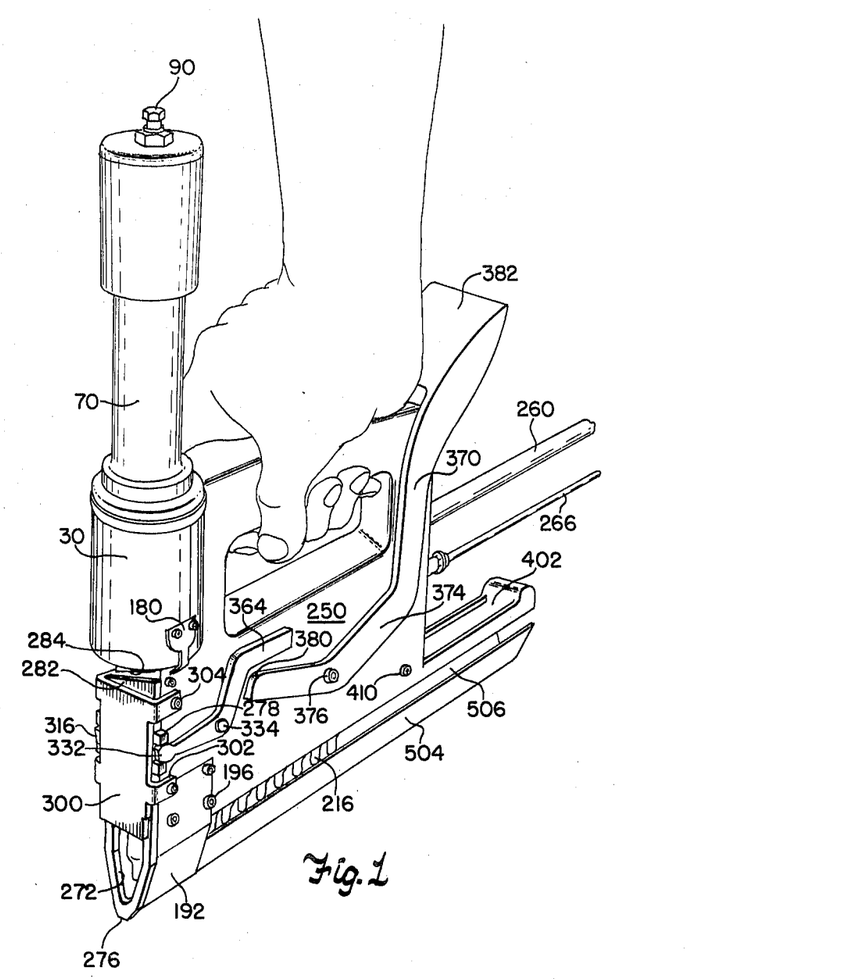
FIG. 1 is a perspective view of a preferred embodiment of the invention showing it being gripped by an operator.
Figure 2:
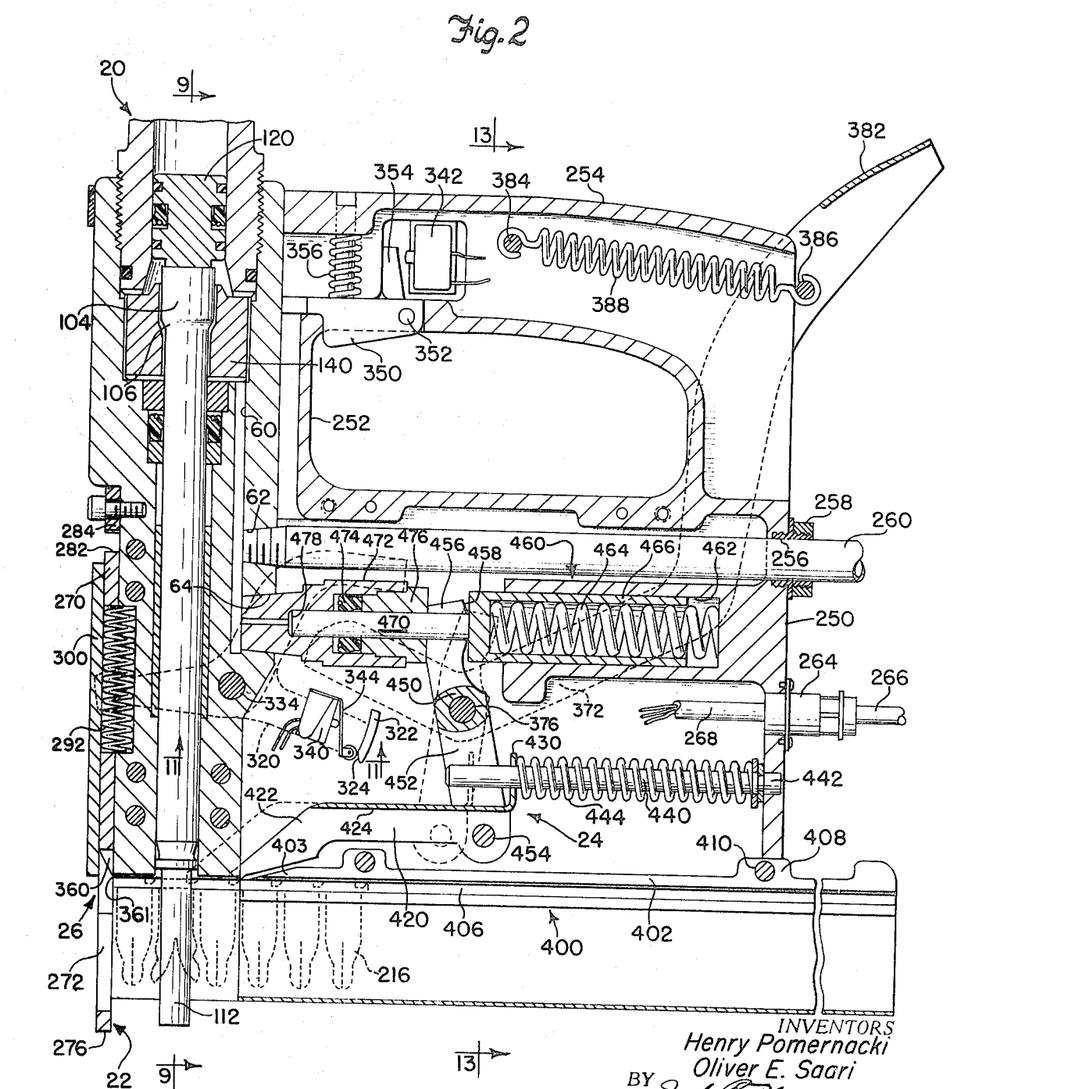
FIG. 2 is a side elevation in partial section of the preferred embodiment of the invention.

The power source previously described is fitted in the illustrated embodiment to a body shell 250 having a central aperture 252 defining a hand grip portion 254. A rear aperture 256 is adapted to accept appropriate fittings 258 for the acceptance and mounting of tubular means 260 carrying the power fluid from its reservoir and supply pump, not shown, to the port 62. Also positioned in casing 250 at its rear or right-hand end, as viewed in FIG. 2, are terminal means 264 for providing electrical access to the control cable 266 on the exterior and internal wiring 268 on the interior of the casing for control of the external pump and its supply of power fluid to the power source. Other details of the casings in body 250 will be described hereinafter with reference to the specific features being described.

CONTROL MEANS

In the operation of the power source, it is necessary to provide mechanical detection means which will insure that the tool is in the proper position for operation prior to the power stroke by the piston. Additionally, control means are provided which are interconnected electrically with the mechanical detection means for purposes of remotely controlling the pump and reservoir which are located at a distance from the power tool. Further, means must be provided for controlling the position of the extreme end of the hammer portion 112 relative to the workpiece since the extended position of the hammer extremity is a definite physical relationship relative to the lower end of the nose piece upon the completion of the power stroke and the extension of the power piston 100 internally of the body.

Figure 8:
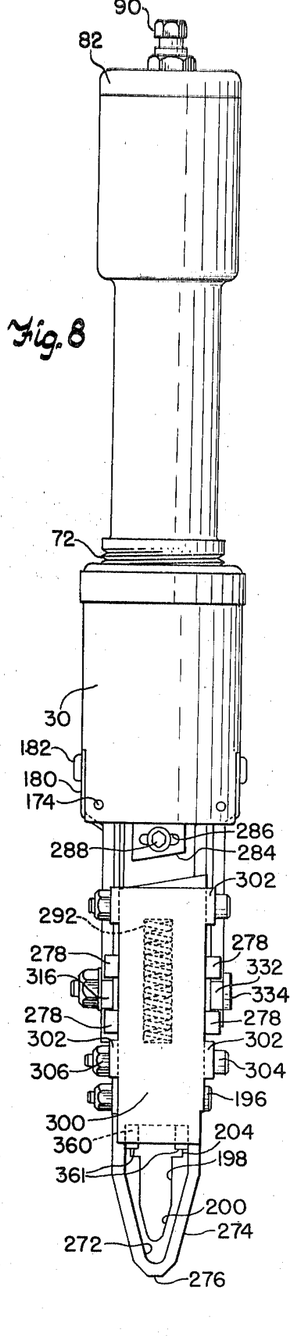
FIG. 8 is a front elevational view of the device shown in FIG. 1.
Figure 9:
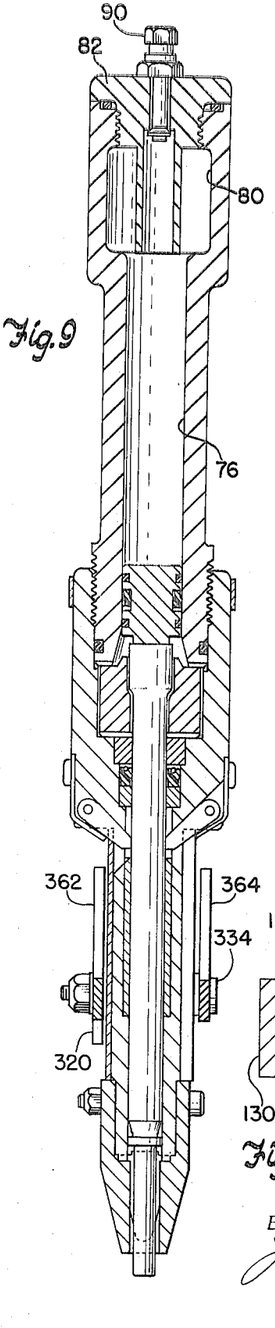
FIG. 9 is a front elevational view in partial section similar to the view in FIG. 4 but with the power drive piston in extended position and having the cut-off mechanism mounted on the side thereof, taken along line 9—9 of FIG. 2.
Figure 11:
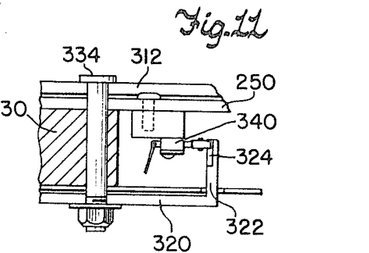
FIG. 11 is partial sectional view, from the bottom of the invention as viewed in the drawings along line 11—11 in FIG. 2, showing a portion of the control means of FIG. 10 in operative relationship to the switch means being controlled.

As best seen in FIGS. 1, 2, 3, 8 and 10, there is provided a flat front face 31 on the lower portion of body 30, adapted to accept a detector blade 270 in sliding superposed relationship thereto. Detector blade 270 is basically a rigid, flat structure having a lower cutout portion 272 at one end which is greater than and generally complimentary in cross-sectional configuration to the passage through the nosepiece defined by walls 198 and 200. The exterior edge surface at said one end of plate 270 forms a nose or reduced section 274 generally complementary to the sloping wall 192 of the nose piece and terminating in a flat surface 276 at its free extremity for contact with the work surface. A pair of lugs or dogs 278 extend laterally from opposite side edges of the blade 270 intermediate their extremities. An aperture 280, generally rectangular in shape, is positioned centrally and intermediate the extremities of the blade. The opposite or upper end 282, as best seen in FIG. 10, present a cammed or sloped surface which is non-perpendicular to the side edges of the blade. End 282 is adapted to cooperate with movable plate 284, as best seen in FIG. 8, having an elongated transverse aperture 286 and a retaining screw 288 affixed to the front face 31. Lateral adjustment of plate 284 will, in cooperation with surface 282, determine the extent of movement of the detector blade 270 in an upward direction, as viewed in the drawing, along the front face 31. An elongated cavity 290 is provided in face 31 and adapted to accept a spring member 292 having a diameter substantially equal to the combined measurement of the thickness of the blade 270 and the depth of the cavity 290. After spring 292 is positioned within the cavity 290, the blade 270 is positioned with the spring member located within the aperture 280. A flat cover plate 300 is positioned over the blade 270 and the assembly maintained in place by lateral flanges 302 extending rearwardly from plate 300 and secured to the body 30 by suitable means such as a screw 304 and nut 306. The cover plate 300 maintains the blade 270 in free sliding relationship to the front face 31 with the spring 292 centering the blade 270 when forces tending to move the blade in either direction have been removed. The lower extremity of blade 270 defined by surface 276 normally extends beyond the free extremity of nose piece 190 before contact with a workpiece.

The effects of movement of the detector blade upwardly against spring 292 when contacting a workpiece are translated into useable impulse by means of a pair of levers 310 and 312 mounted on opposite sides of body 250. The lever 310 has a forward portion 314 terminating in a cammed bulbous tip 316 adapted to be accepted between the adjacent side lugs 278. Lever 310 is provided with a central pivot point aperture side lugs 278. Lever 310 is provided with a central pivot point aperture 318 and a rearwardly extending arm 320 terminating in a laterally extending flange 322 having a cammed surface 324 adjacent its lower edge, as viewed in FIGS. 2 and 10. Lever 312 is provided with a forward portion 330 and a similar bulbous tip 332 for acceptance between the lugs 278 on the adjacent side of 270. Intermediate the extremity of lever 312, there is positioned a stud 334 at its pivot point and adapted to be accepted within the pivot point aperture 318 of the lever 310.

Within the case 250 there are positioned two switches 340 and 342. Switch 340 is provided with a spring pivot arm 344 adapted to be in contact with the cam 324 of lever 310. In the upper portion of casing 250, there is provided in the hand grip aperture 252 a trigger switch lever 350 pivoted at 352 and having an upwardly extending lever 354. The switch trigger 350 is adapted to act against adjustable spring 356 when an upward pressure is brought to bear on trigger 350, as viewed in FIG. 2, to swing flange 354 into contact with switch 342. Switches 340 and 342 are connected in series internally of the casing by appropriate means with the cable 268. When the trigger 350 is squeezed, switch 342 is closed, but the circuit will not be complete unless the detector blade 270 is moved upwardly, as viewed in FIG. 2, so as to pivot lever 310 and move the cam surface 324 downwardly to actuate switch 340 and thereby close the series circuit. If pressure against the nose 276 of blade 270 is removed, as by removal of the tool from the work surface, the circuitry will be opened and electrical power to the pump which supplies the power fluid will be cut off and the power stroke will be unable to proceed in its cycle. Thus, the tool must be in a predetermined position for driving, as well as having the trigger 350 depressed in order to carry out its sequence of firing.

CUT-OFF MECHANISM

The collated strip 216 with which the tool is adapted to operate includes a plurality of fasteners 217 which are maintained in a predetermined spaced relation by the supporting strip. The proposed strip, which has been indicated will be disclosed in a co-pending application, envisages a series of plastic carrying means for orientation of the fasteners with the head portions of the carrying means being interconnected. After a series of fasteners have been fired, the carrying means or strip, will be ejected forwardly through the aperture 272. At times, when spacing of the environment are tight, it is necessary to dispose of the strip and hence a cut-off mechanism has been provided. The detector blade 270 is provided on opposite upper sides of the aperture 272 with a pair of depending knives 360 having knife edges 361. The back surface of each knife 360 is coplanar with the surface of blade 270 riding on the front surface 31 while the front surface of each knife 360 is tapered to intersect said back surface and provide the cutting edge 361. The detector blade levers 310 and 312 include upper extensions 362 and 364 respectively which extend upwardly and rearwardly from the pivots 318 and 334. For operation of this device, a manual lever 370 is mounted on body 250 and provided with a pair of arms 372, 374 pivoted centrally thereof at 376 and having cammed surfaces 378 and 380 at their respective far extremities. The lever 370 is provided with a yoke connecting portion 382 at its upper extremity forming a handle for manual engagement by the operator. A pin 384 is positioned internally of the handle 254 of casing 250 and a similar pin 386 extends between arms 372 and 374, intermediate the extremities of lever 370. A tension spring 388 extends between the pins 384 and 386 and maintains the lever 370 and its associated cam surfaces 378 and 380 out of contact with the upper portions 362 and 364 of detector blade levers 310 and 312 with pin 386 serving as the stop means which by engaging with case 250 serves as the lever orientation means. Depressing lever 270 by application of a force to the handle 382, pivots the lever 370 about point 376 to bring the cam surfaces 378-380 into engagement with the undersurface of the upper portions 362 and 364 of the lever arms 310 and 312. The bulbous connections 316 and 332 at the opposite end of the lever arms then act on the lugs 278 to move the detector blade downwardly against spring 292, as viewed in FIGS. 2 and 8, to bring the knife edges 361 into engagement with the collated strip of the type shown in phantom shown in FIG. 2, to sever the used portions of the strip extending outwardly through the aperture 272. Release of pressure on handle 382 permits the spring 388 to move the lever 370 back to its position of rest, and spring 292 to return the blade 270 to its normal position of rest.

FEED MECHANISM

Figure 12:
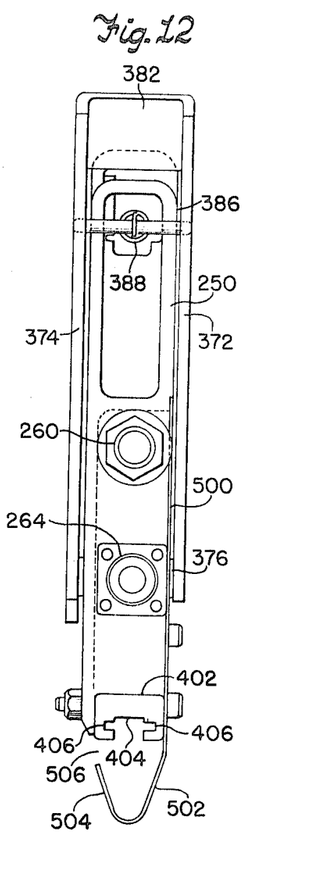
FIG. 12 is an end view of the device shown in FIG. 2 as viewed from the right-hand end of that drawing.

As has been previously discussed, the collating means 216 for the fasteners adapted to be used with this embodiment of power tool includes plastic members which are joined at their head and have laterally extending flange means and body means depending from said heads. At the base of the body shell 250, there is provided a guide rail means 400, see FIGS. 2, 12 and 13, which includes a grooved casting 402 having a downwardly opening slot 404 extending the longitudinal length of the casting 402. The slot 404 includes lateral grooves 406 which are aligned with and complimentary to the grooves 204 in the nose piece. Suitable flange means 408 are provided to accept fasteners 410 for mounting the casting relative to the body 250. The collated strip 216 is inserted from the back end of the slot 404, opposite nose piece 190, the heads of the strip riding in the grooves 406 and the body portions depending downwardly, as shown in phantom in FIG. 2.

Figure 13:
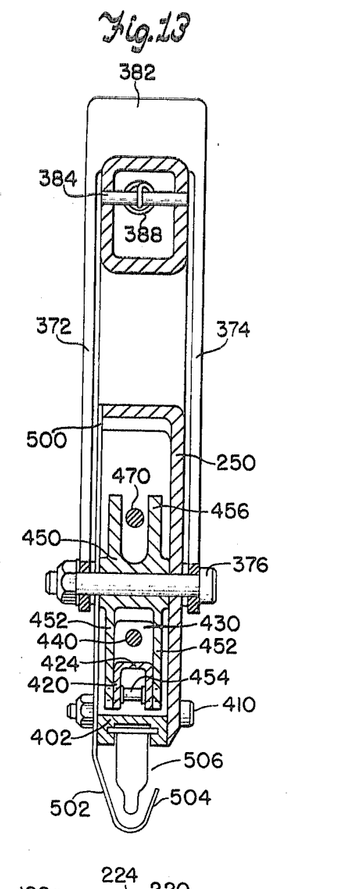
FIG. 13 is a partial sectional view taken along the line 13—13 in FIG. 2.

The feed mechanism includes advancing means for sequentially advancing individual fasteners into position under the hammer 112. Referring to FIGS. 2, 13 and 14, the advancing means include fingers means 420 consisting of a pair of narrow sheet metal members 422 interconnected by a flange 424. An abrupt shoulder 426 is formed at the free end of each of the members 422, while the undersurface thereof includes a double tapered cam surface designated at 428 and 429. At the opposite extremity of the finger means 420 and connected to flange 424, is an upstanding apertured flange 430 having a central aperture 432. Each of the finger means 420 include oppositely disposed apertures 434 which are in registry with one another and are positioned adjacent the end carrying flange 430.

A rod 440 is mounted at one end 442, in the casing 250 by suitable means, such as screw threads or welding, and extends cantilever fashion into the interior of the case 250. Rod 440 has mounted thereon a compression spring 444. The spring 440 normally occupies substantially the entire length of rod 440. The aperture 432 of flange 430 of the finger means 420 is positioned on the free extremity of rod 440 and moved to the right, as viewed in FIG. 2, to compress the spring 444. It will be noted that the casting 402 at the end 403 adjacent its juncture with the nosepiece 190, is milled away to expose the groove 406 to the ends 426 of the finger means 420. The finger means 420 is pivoted about its aperture 434 and normally spring urged downwardly to the left by the weight of the finger means and the spring 444.

A double yoke member 450 is pivoted on pin 376 and provides a pair of arm members 452 extending downwardly and embracing the finger means 420. A pivot pin 454 connects the pivot aperture 434 of the finger means and suitable aperture means in the yoke arms 452. It should be noted that the aperture 432 in the finger means, is slightly larger in diameter than the rod 440 so that movement of the yoke arms 452 in a direction to the left in FIG. 2 will always permit the finger means 420 to depend downwardly into the groove 406 of the track 400 and the groove 204 in the nose piece 190. It should be noted that the spring 444 has a predetermined strength for urging the finger means 420 in the direction to the left toward the nose piece. To control the advancing means, the yoke has a second pair of arms 456 extending upwardly opposite the arms 452. The arms 456 have a cam surface 458 on their rear edge abutting the spring urged stop means 460 which has a strength substantially from four to six times greater than that of power spring 444. The stop means 460 includes a cavity 462 in the body 250, a spring 464 and a cap-like plunger 466 which is freely slidable within cavity 462 and in encompassing relation to spring 464. Plunger 466 acting against the cam surfaces 458 of the yoke 450, tends to urge the finger means 420 in the direction to the right since spring 464 is many times stronger than the power spring 444 and thereby overcomes the force of spring 444.

To overcome the stop 460 a piston 470 is provided in opposition to the plunger 466. A cylinder 472 is threadedly mounted in the port 64 and access provided to the bore 60 carrying the power fluid. Suitable seal means 474 is provided within the cylinder 472 acting against a stop 476. The piston 470 is so dimensioned that it abuts plunger 466 with one end at all times and in the retracted position, shown in FIG. 2, is seated on a shoulder 478 at its end opposite the plunger 466, thereby controlling the relative movement of plunger 466 in an outward or direction to the left.

The operation of the feed means is as follows: When the trigger 350 is squeezed, detector blade 270 is moved to actuate switch 340, power fluid is introduced through the tube 260 into bore 60. Power fluid then flows from port 64 into the cylinder 472 and movement of the piston 470 overrides the spring 464 by moving it to the right, as viewed in FIG. 2. By removal of stop means 460 the power spring 444 is permitted to act upon the flange 430 and attempt to move the finger means 420 to the left. The power piston 100 in its lower or extended position provides a stop means against which the end of the collated strip can come to rest or, as is shown in FIG. 2 in phantom, the hammer portion 112 projects through the interior of one portion of the collated strip and prevents movement thereof until, during the power cycle, the power piston 100 is retracted. When the hammer 112 in its upward movement clears the collated strip, the abrupt shoulder 126 engages a complementary shoulder in the strip and moves it forward with a rocking of the yoke 450 as shown in phantom. The collated strip has a series of notch-like grooves for acceptance of the shoulder means 426 of the finger 420 and the stroke of the finger means is controlled by the movement of the yoke 450 until it touches the plunger 466 in retracted position. This is a calculated position to insure proper positioning of the collated strip beneath the power piston. When the cycle is complete, the fastener is driven through the collated holder into the work structure and the power fluid is then evacuated through the tube 260. This permits the piston 470 to return to its seated position against shoulder 478 and the spring 464, being much stronger than spring 444, swivels the yoke 450 to the solid line position shown in FIG. 2, thereby retracting the finger means with the cam surfaces 428–430 riding across the upper surface of the collated strip 216 until the shoulder means 426 engage the next notch in the strip. The feeding means is then ready for recycling.

It will be noted in FIG. 13 that the body shell 250 is open on the left side and bottom to provide access to the interior. A thin sheet metal cover 500 is used to cover the interior of the body shell 250. Cover 500 has at one extremity, an inwardly and thence upwardly directed bottom or nose portion 502 which protects the strip of collated fasteners from damage as they are moved along the grooves 406. The upwardly turned portion 504 terminates in spaced relation to the rail casting 402 to provide a slot 506 which permits the operator to move independent or short sections of collated fasteners along the guide rail. It will be recognized, of course, that power means such as a spring, could be used for this purpose, but it has been found unnecessary when access is so readily available through the slot 506.

Thus, it will be apparent to those skilled in the art, that an economical, high velocity, high force, power source is combined with a simple, fail-safe positive positioning of a collated strip of fasteners for driving into a work structure. The safety features, such as a detector blade when mechanically moved, provides a circuit actuating means for remotely controlling the reservoir and pump used for introducing the power fluid into the power device.

We claim:

1. A feed mechanism for advancing a collated strip of articles a predetermined distance including track means adapted to support said strip, movable first stop means for interrupting movement of said strip, advancing means for moving said strip when said first stop means is removed from the path of travel along said track, power means for actuating said advancing means, second movable stop means for controlling actuation of said advancing means said predetermined distance, the advancing means including a pair of finger members connected by suitable means in spaced relation, the finger members oscillating said predetermined distance from an initial position to a secondary position and back to said initial position, the finger members including protuberance means at one end engageable within complementary recesses in said strip, said protuberance means including an abrupt shoulder on the edge facing the direction of the advancement of said strip to said secondary position and a cam surface to retract said protuberance from the strip recess when said finger means is retracted to said initial position, apertured support engaging means spaced from said protuberance means and including an apertured flange integral with the connecting means and adapted to accept rod-like support means in sliding relation for rectilinear movement along said support means, said power means including a compression spring encircling said rod-like member and normally biased against said flange to urge the fingers into cooperation with said strip and said strip towards said first stop means.

2. A feed mechanism of the type set forth in claim 1 wherein said second stop means is movable from a first position to a second position, means connected to said finger means engageable with said second stop means and adapted to permit movement of said fingers from said initial position to said secondary position when said second stop means has moved to its second position.

3. A feeding mechanism of the type set forth in claim 2 wherein said connecting means is a lever pivotally supported intermediate its length and pivotally connected to said fingers adjacent one end, said lever adapted to bear on said second stop means adjacent its opposite end.

4. A feeding mechanism of the type set forth in claim 2 wherein said movable second stop means includes a spring urged member stronger than said power means and adapted to normally urge said fingers to their initial position, means to override the spring of said second stop means and to move the stop means to its second position whereby said power means can operate said fingers and strip toward said first stop means.

5. A feeding mechanism of the type set forth in claim 4 wherein removal of the overriding force against said second stop means permits the spring of said second stop means to overpower the finger advancing power means and return the fingers to their initial position.

6. A feeding mechanism of the type set forth in claim 5 wherein the overriding force against said second stop means is a pressure actuated plunger, the pressurized medium acting on said plunger also providing the motivating force for the movement of said first stop means.

* * * * *